United States Patent
White et al.

(10) Patent No.: US 10,173,664 B2
(45) Date of Patent: Jan. 8, 2019

(54) EXPANDING REGENERATIVE CAPACITY UP TO VEHICLE DYNAMIC LIMITS THROUGH INTEGRATION WITH MITIGATIVE SUBSYSTEMS

(71) Applicant: GM GLOBAL TECHNOLOGY OPERATIONS LLC, Detroit, MI (US)

(72) Inventors: Marsella L. White, Howell, MI (US); Michael G. Petrucci, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 17 days.

(21) Appl. No.: 15/244,008

(22) Filed: Aug. 23, 2016

(65) Prior Publication Data

US 2017/0072941 A1    Mar. 16, 2017

Related U.S. Application Data

(60) Provisional application No. 62/217,924, filed on Sep. 13, 2015, provisional application No. 62/217,851,
(Continued)

(51) Int. Cl.
| | | |
|---|---|---|
| *B60W 20/14* | (2016.01) | |
| *B60L 7/18* | (2006.01) | |
| *B60L 7/10* | (2006.01) | |

(52) U.S. Cl.
CPC ............. *B60W 20/14* (2016.01); *B60L 7/10* (2013.01); *B60L 7/18* (2013.01); *B60L 2240/22* (2013.01); *B60L 2240/423* (2013.01); *B60W 2510/083* (2013.01); *B60W 2520/14* (2013.01); *B60W 2710/083* (2013.01); *B60Y 2200/92* (2013.01);
(Continued)

(58) Field of Classification Search
None
See application file for complete search history.

(56) References Cited

U.S. PATENT DOCUMENTS

| | | |
|---|---|---|
| 2004/0044458 A1 | 3/2004 | Kadota |
| 2007/0158119 A1 | 7/2007 | Pascoe |

(Continued)

FOREIGN PATENT DOCUMENTS

| | | |
|---|---|---|
| CN | 101024377 A | 8/2007 |
| CN | 101454188 A | 6/2009 |

*Primary Examiner* — Mussa A Shaawat
*Assistant Examiner* — Kyung J Kim
(74) *Attorney, Agent, or Firm* — Quinn IP Law

(57) ABSTRACT

A method of determining a regeneration schedule for a vehicle having an internal combustion engine, an electric machine, and a plurality of yaw rate actuators. The method includes determining an allowable yaw rate change based on dynamic conditions of the hybrid vehicle, a combined mitigation potential of the yaw rate actuators, and a regeneration torque command that causes an actual yaw rate change. Determining the regeneration torque command includes comparing the allowable yaw rate change to the combined mitigation potential. If the combined mitigation potential is less than the allowable yaw rate change, the regeneration torque command causes or limits the actual yaw rate change to be lower than the allowable yaw rate change. If the combined mitigation potential is greater than the allowable yaw rate change, the regeneration torque command causes or limits the actual yaw rate change to be substantially equal to the allowable yaw rate change.

5 Claims, 7 Drawing Sheets

Related U.S. Application Data filed on Sep. 12, 2015, provisional application No. 62/217,932, filed on Sep. 13, 2015.

(52) U.S. Cl.
CPC ... *B60Y 2300/18125* (2013.01); *Y02T 10/642* (2013.01); *Y10S 903/947* (2013.01)

(56) References Cited

U.S. PATENT DOCUMENTS

| | | |
|---|---|---|
| 2009/0242289 A1 | 10/2009 | Murty |
| 2014/0018988 A1* | 1/2014 | Kitano .................. B60L 15/025 701/22 |

\* cited by examiner

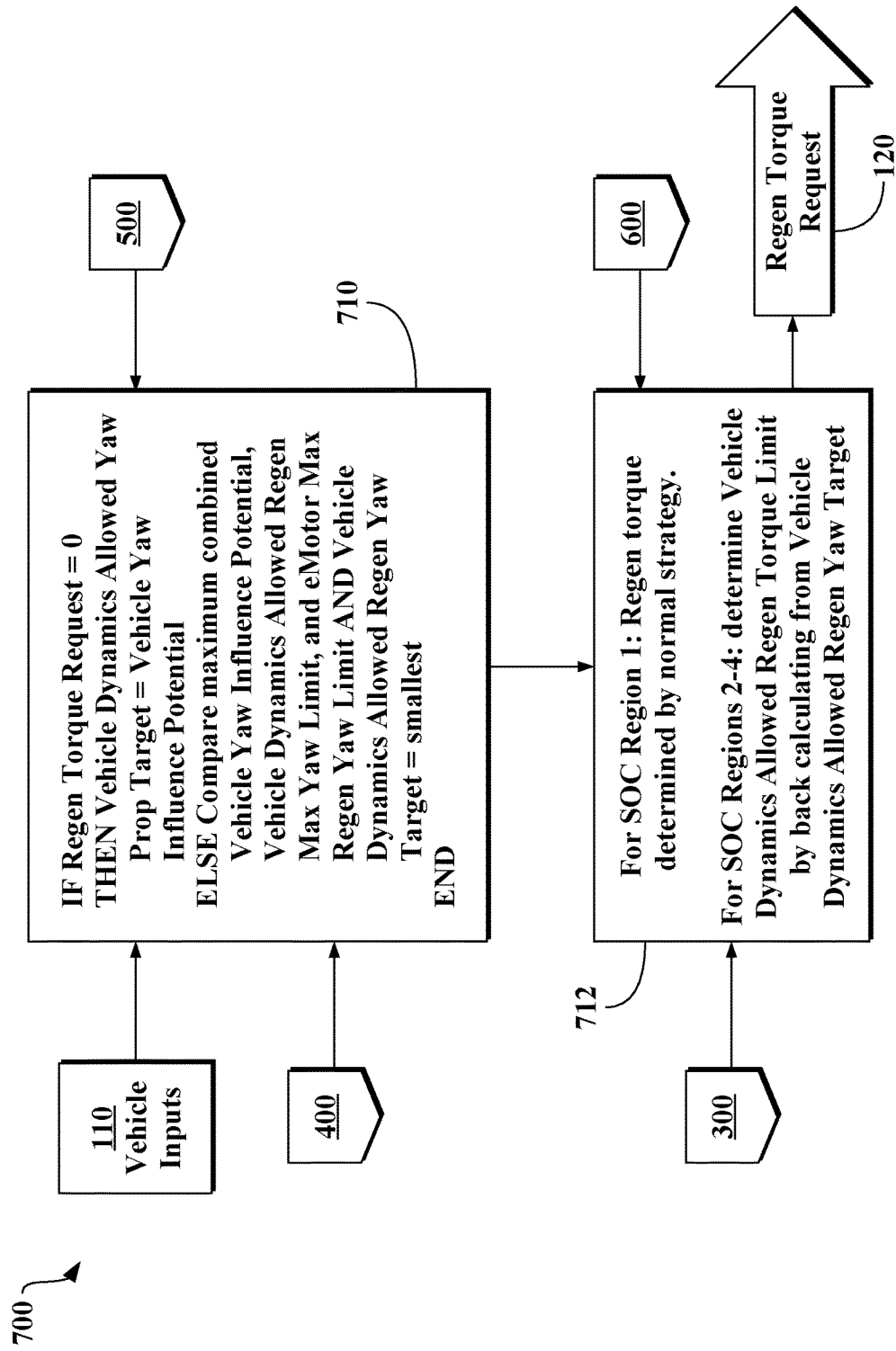

_US 10,173,664 B2_

EXPANDING REGENERATIVE CAPACITY UP TO VEHICLE DYNAMIC LIMITS THROUGH INTEGRATION WITH MITIGATIVE SUBSYSTEMS

CROSS-REFERENCE TO RELATED APPLICATIONS

This application claims the benefit of U.S. Provisional Application No. 62/217,924, filed Sep. 13, 2015; U.S. Provisional Application No. 62/217,851, filed Sep. 12, 2015; and U.S. Provisional Application No. 62/217,932, filed Sep. 13, 2015; each of which are hereby incorporated by reference in their entirety.

TECHNICAL FIELD

This disclosure generally relates to control of hybrid powertrains.

BACKGROUND

Hybrid vehicles—whether industrial, heavy duty, military, passenger, or performance—include multiple propulsion systems or actuators, such as electric motor/generators and different types of internal combustion engines.

SUMMARY

A method of determining a regeneration schedule for a hybrid vehicle is provided. The hybrid vehicle has an internal combustion engine, an electric machine—either decoupled or coupled with the internal combustion engine—and a plurality of yaw rate actuators.

The method includes determining an allowable yaw rate change based on dynamic conditions of the hybrid vehicle, determining a combined mitigation potential of the yaw rate actuators, and determining a regeneration torque command that causes an actual yaw rate change.

Determining the regeneration torque command includes comparing the allowable yaw rate change to the combined mitigation potential. If the combined mitigation potential is less than the allowable yaw rate change, the regeneration torque command causes or limits the actual yaw rate change to be lower than the allowable yaw rate change. If the combined mitigation potential is greater than the allowable yaw rate change, the regeneration torque command causes or limits the actual yaw rate change to be substantially equal to the allowable yaw rate change.

The above features and advantages, and other features and advantages, of the present subject matter are readily apparent from the following detailed description of some of the best modes and other embodiments for carrying out the disclosed structures, methods, or both.

BRIEF DESCRIPTION OF THE DRAWINGS

FIG. 3F is a schematic detail of a block 700 of FIG. 2, illustrating remediation between the vehicle dynamics limits, yaw rate influencers, and electric machine-derived yaw rate, and output as a regenerative torque request.

DETAILED DESCRIPTION

Figure 1:
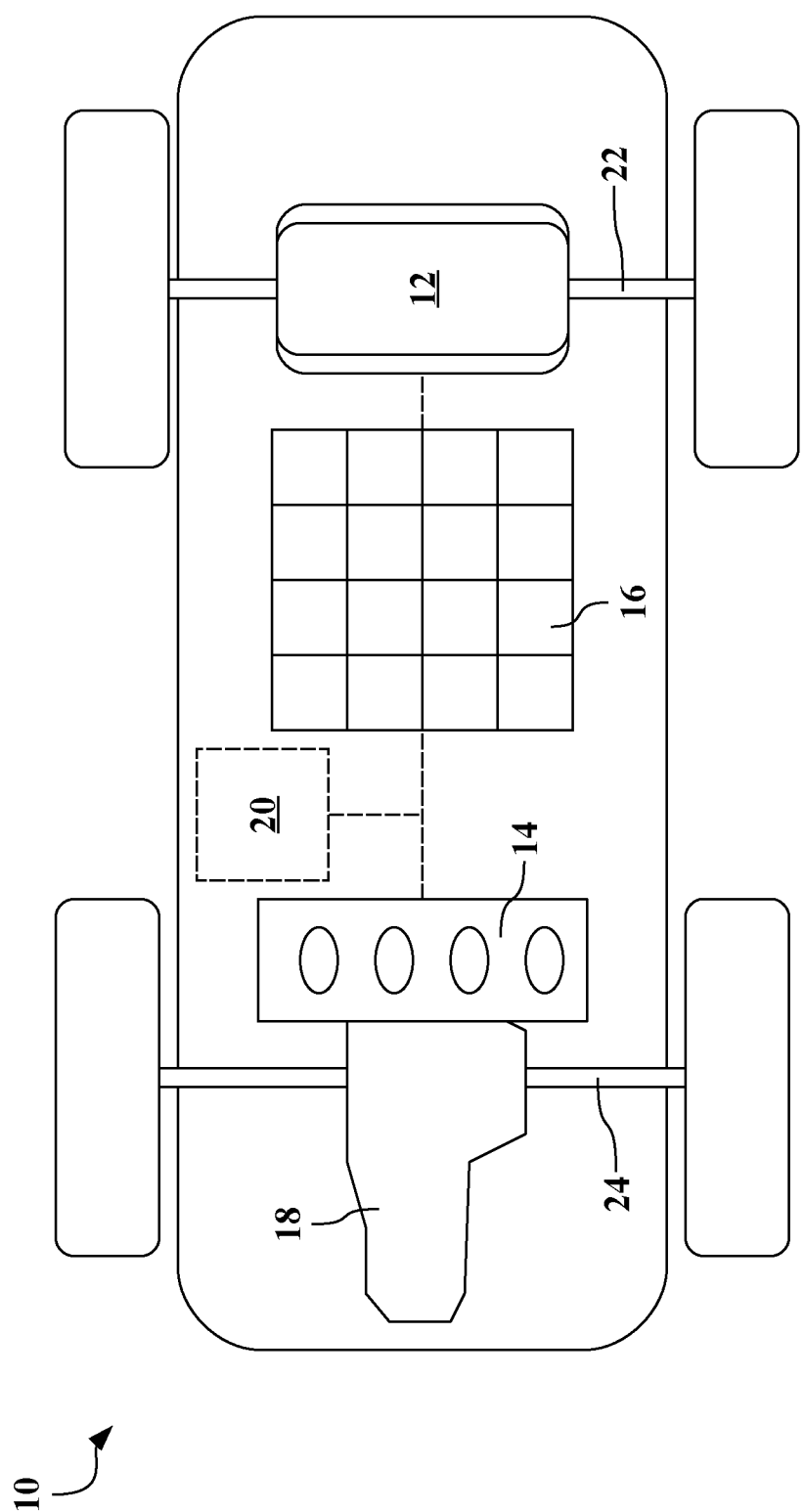
FIG. 1 is a schematic, diagrammatic view of a hybrid vehicle having decoupled actuators, including at least one internal combustion engine and at least one electric machine.

Referring to the drawings, like reference numbers correspond to like or similar components whenever possible throughout the several figures. FIG. 1 broadly illustrates a diagrammatic view of a hybrid vehicle 10, which has two actuators that are decoupled from each other. The vehicle 10 is representative of any rolling or moving platform. There is no mechanical connection, on the vehicle 10, between an electric machine 12 and an internal combustion engine 14 (or ICE 14). However, note that other hybrid configurations or architectures may utilize the control schemes described herein, including those with mechanically coupled actuators.

The electric machine 12 may also be referred to as a motor/generator or eMotor, and is capable of operating as either an electric motor, which converts electrical energy into kinetic energy, or as electric generator, which converts kinetic energy into electrical energy. An energy storage device (ESD) or battery 16, which may be a chemical battery or battery pack, is electrically connected to the electric machine 12. The battery 16 may either store electrical energy generate by the electric machine 12 or may dispense electrical energy to operate the electric machine 12 in motor mode.

A transmission 18 is operatively coupled to the ICE 14 and may have a number of fixed gears, may be continuously variable, or may be a combination therebetween. The transmission 18 is mechanically coupled to the ICE 14 and selectively provides speed and torque ratio manipulation of the ICE 14. A control system or controller 20 is in communication with all of the components shown, as well as other components of the vehicle 10, and includes sufficient computational resources or processing power to execute the control schemes described herein.

The controller 20 includes sufficient processing capability, memory, storage, and communication structures and capabilities to perform any calculations or determinations described herein. The controller 20 is configured to send and receive data, and to effectuate commands based on such calculations or determinations. The controller 20 may be dedicated to only the functions described herein, or may be part of a larger control system.

A first axle 22 is mechanically coupled to the electric machine 12, such that the electric machine 12 selectively transfers torque to and from the first axle 22 and the wheels (not numbered) attached thereto. A second axle 24 is mechanically coupled to the transmission 18, such that the ICE 14 and the transmission 18 selectively transfer torque to and from the second axle 24 and the wheels (not numbered)

attached thereto. However, the vehicle 10 illustrated does not include a direct mechanical connection between the first axle 22 and the second axle 24.

The vehicle 10 may include additional components (not numbered or not shown) including, without limitation: a traction power inverter module (TPIM), a belt alternator starter (BAS) or conventional starter, numerous high-voltage cables, and serial cables or other wired or wireless information transfer mechanism. The vehicle 10 includes numerous sensors or virtual sensors (not shown), including, without limitation: at least one inertial sensor, such as an accelerometer or an inertial measurement unit, for measuring and monitoring magnitude and direction of lateral acceleration and longitudinal acceleration; wheel slip sensors; speed sensors; yaw sensors; or yaw rate sensors.

Note that either end of the vehicle 10 illustrated may be the front end—i.e., the end defining forward operation. The ICE 14 may be front, mid, or rear mounted and may be mechanically coupled to either the front or rear axle from any mounting location, which the electric machine 12 mechanically coupled to the other axle.

In addition or as an alternative to the battery 16 and the electric machine 12, the vehicle 10 may include other hybrid energy storage devices and primary movers. For example, and without limitation, inertial storage systems, such as flywheels, may impart regenerative torque by storing kinetic energy in movement of the flywheel. That stored mechanical energy may then later be transferred back into the driveline of the vehicle 10. Hydraulic hybrid architectures may also be utilized, such that regenerative torque is applied to pressurize, and then store, a hydraulic fluid. The stored pressure may subsequently be used to output positive torque to the driveline of the vehicle 10.

While the vehicle 10 is driving, the controller 20 determines a driver-demanded regeneration level. This is the normal regeneration strategy or schedule, and is based on the amount of regenerative torque that can be introduced by the electric machine 12 without disturbing the vehicle dynamics—i.e., the amount of regeneration that will not negatively alter the driving feel or driving experience. The driver-demanded regeneration level may be an output from an algorithm that converts driver or vehicle inputs (including accelerator pedal, brake pedal, driving mode selection) into a regeneration torque requests within the normal regeneration schedule. The driver-demanded regeneration level may also come from autonomous sources or systems (for example, and without limitation, adaptive cruise control or electronic stability systems).

However, during performance driving, the state of charge (SOC) of the battery 16 may be rapidly depleted, such that the normal regeneration schedule is unable to recharge the battery 16, which may leave the vehicle 10 without use of the electric machine 12 for motoring. Therefore, during performance driving, the controller 20 may implement an expanded regeneration schedule.

The expanded regeneration schedule allows charging of the battery 16 during additional driving conditions. However, the expanded regeneration schedule may increase driving disturbances or instances of negative driving feel, if the expanded regeneration is not countered or mitigated by other systems of the vehicle 10.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

Figure 2:
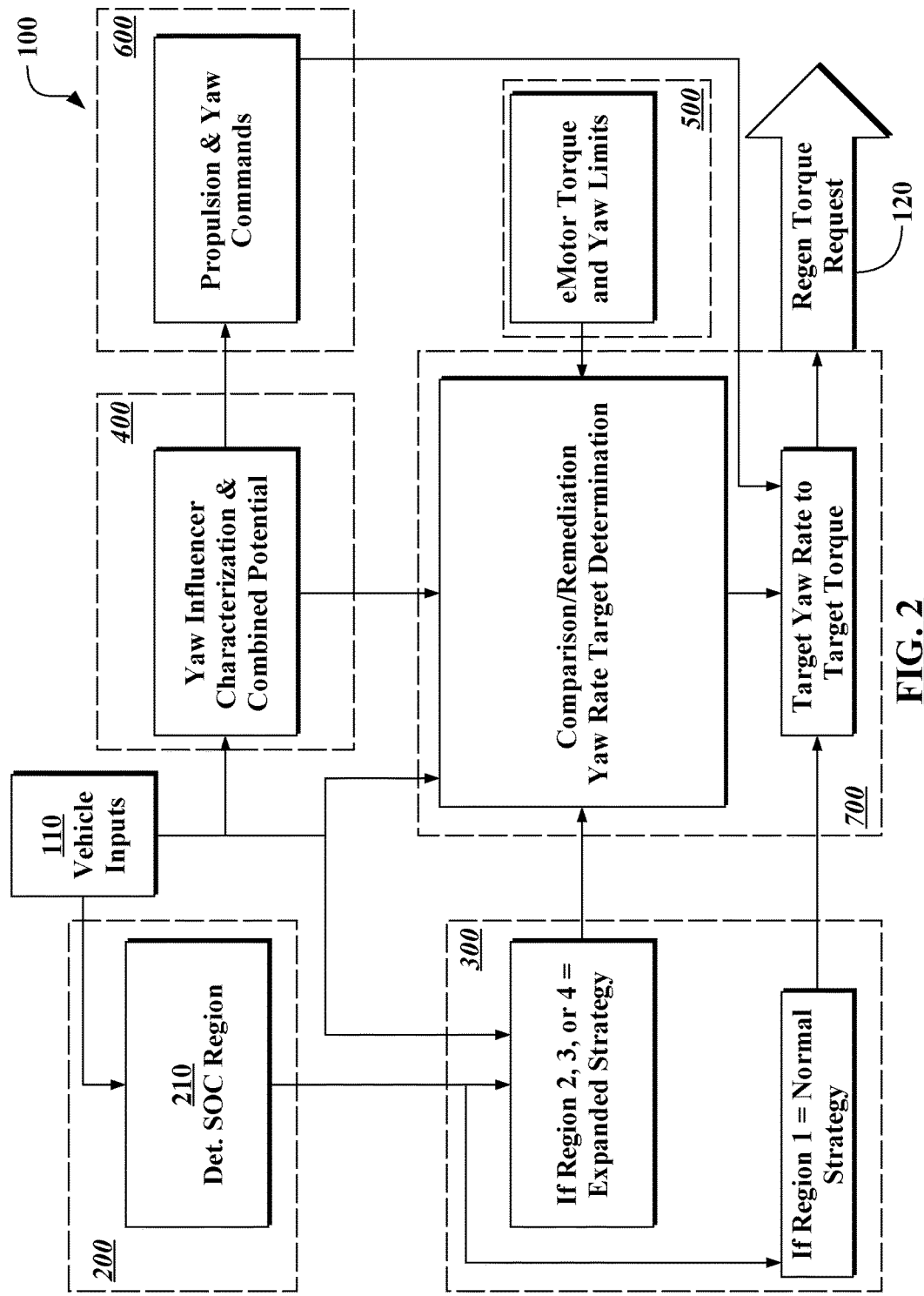
FIG. 2 is a schematic, block diagram for controlling hybrid vehicles, including that shown in FIG. 1.

Referring also to FIG. 2, and with continued reference to FIG. 1, there is shown a control scheme 100, which is illustrated by a partial block 500 diagram or flow diagram, for regeneration strategy in hybrid vehicles. The diagram 100 may be described herein with reference to components of the hybrid vehicle 10. However, the diagram 100 may also be utilized, in whole or part, on hybrid vehicles having different architectures, configurations, or capabilities.

The control scheme 100 is illustrated in six sub-regions or blocks, which are labeled blocks 200, 300, 400, 500, 600, and 700. However, determinations, inputs, outputs, and calculations made in one block may be used in another. The blocks are delineated only for illustrative purposes and are not intended to be limiting. Referring also to FIGS. 3A, 3B, 3C, 3D, 3E, and 3F, and with continued reference to FIGS. 1-2, there are shown detail or descriptive views of the blocks 200-700 of FIG. 2.

Through the control scheme 100, a plurality of vehicle and driver inputs, which may be referred to as vehicle inputs 110, are used to determine one or more regenerative torque requests, which may be referred to as regen torque request 120. The component primarily controlled by the regen torque request 120 is the electric machine 12, but other components, including addition electric machines, may also be controlled in response to the regen torque request 120.

Figure 3A:
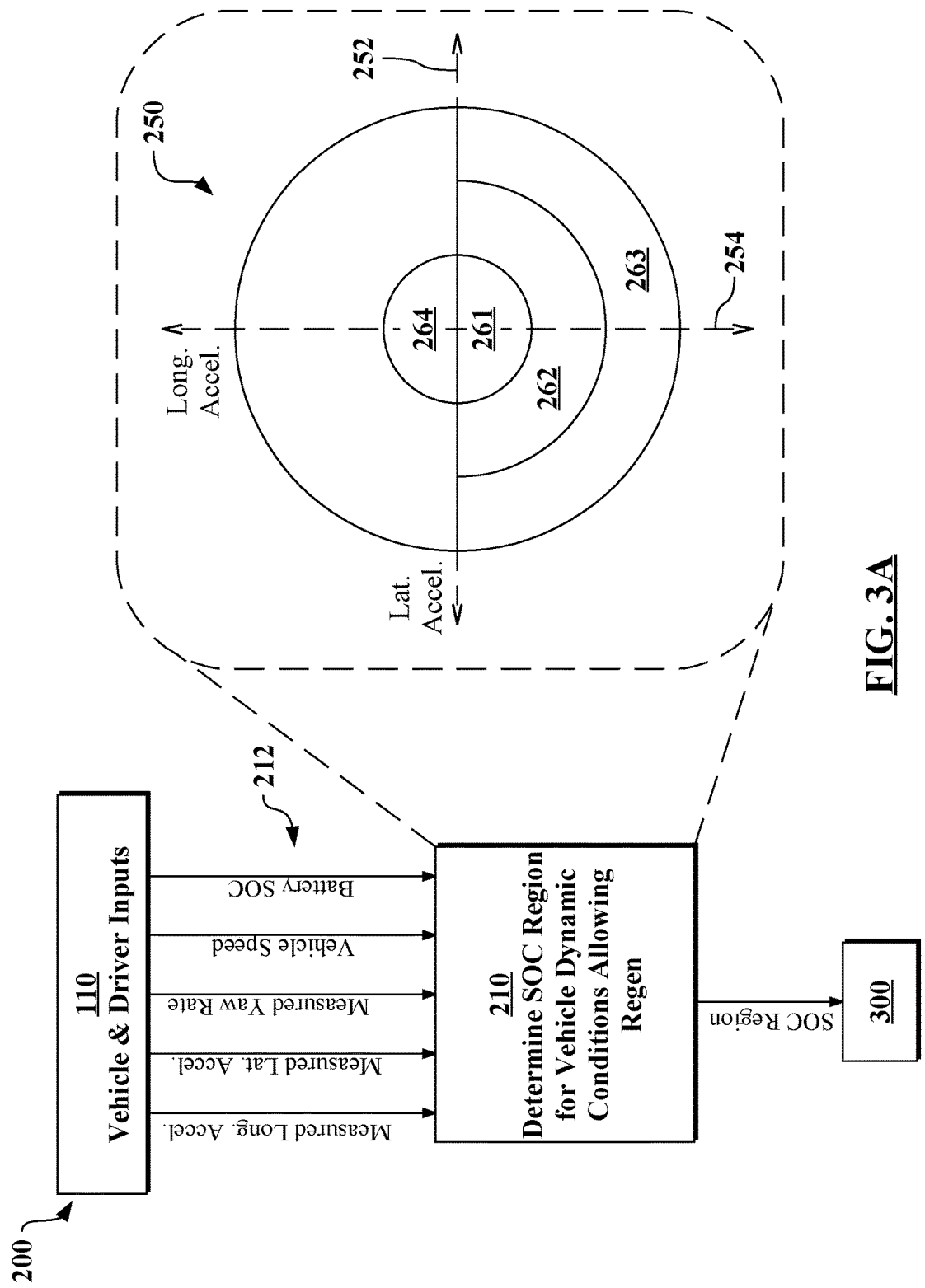
FIG. 3A is a schematic detail of a block 200 of FIG. 2, illustrating determination of state of charge regions for an expanded regeneration schedule.

FIG. 3A is a schematic detail of the block 200 of FIG. 2, and generally illustrates selection or determination of an SOC region, which is output or sent to the block 300. A determination block 210 receives a plurality of individual inputs 212, which are generally portions of the vehicle inputs 110. The individual inputs 212 discussed or shown herein are illustrative only, and do not limit the scope of available information used to determine the SOC region.

The determination block 210 utilizes a friction chart or friction circle 250 to find an SOC region and output it to the block 300. The friction circle 250 illustrates selectable regions of allowable vehicle dynamics under which regeneration may occur. Each of the envelopes or regions represents a set of boundary conditions within which the vehicle 10 will allow regeneration by the electric machine 12.

FIG. 3A illustrates the friction circle 250 showing the traction of a vehicle, such as the vehicle 10 shown in FIG. 1. A lateral axis 252 shows lateral acceleration of the vehicle 10 and a longitudinal axis 254 shows longitudinal acceleration of the vehicle 10. The outer bounds of the friction circle 250 represent conditions beyond which the vehicle 10 maintains grip or control. Note that the friction circle 250 is vehicle dependent, need not be a perfect circle, and will often be an ellipse.

In order to maintain the state of charge (SOC) of the battery 16 within preferred ranges, the controller 20 determines a range of vehicle dynamic conditions under which regeneration will be allowed. Specific points within the friction circle 250 (or ellipse) represent the dynamic interaction between the vehicle 10 (through its tires) and the road surface based on lateral and longitudinal vehicle acceleration, as illustrated by the lateral axis 252 and the longitudinal axis 254, respectively. The center represents zero lateral or longitudinal acceleration, and the edges represent higher acceleration. Deceleration is shown on the lower half of the friction circle 250. The lateral and longitudinal acceleration may be sensed, estimated, or calculated from other sensor data.

In the configuration shown, there are four SOC regions or envelopes within the friction circle 250, a first SOC region 261, a second SOC region 262, a third SOC region 263, and a fourth SOC region 264. Each SOC region represents ranges of dynamic vehicle conditions under which the regeneration may be allowed. The regions are progressive, such that each larger region envelopes and includes all of the smaller regions. The SOC regions may be dependent on the required or desired vehicle dynamic behavior during regeneration.

The first SOC region 261, which may be referred to as SOC Region 1, covers dynamic conditions in which the vehicle 10 is decelerating at relatively low rates and is involved in relatively low lateral acceleration rates. The second SOC region 262, which may be referred to as SOC Region 2, includes all portions of the first SOC region 261 plus additional lateral acceleration and additional deceleration. Therefore, the second SOC region 262 includes regeneration under driving conditions that result in relatively higher levels lateral acceleration, longitudinally acceleration, or both, relative to the first SOC region 261.

The third SOC region 263, which may be referred to as SOC Region 3, includes all of the second SOC region 262 (which envelopes the first SOC region 261), plus additional lateral acceleration and additional deceleration. The fourth SOC region 264, which may be referred to as SOC Region 4, includes the third SOC region 263 (which includes or envelopes the first SOC region 261 and the second SOC region 262), plus some forward acceleration with low levels of lateral acceleration.

In the determination block 210, a battery SOC logic algorithm determines, based on the needs of the battery 16 and the vehicle 10, whether regeneration will be limited to one of the smaller regions, or will be expanded to the larger regions. When allowing regeneration in only the first SOC region 261, the vehicle 10 will only recharge the battery 16 during limited driving conditions. However, in the fourth SOC region 264, regeneration opportunity will be available in a more expanded range of vehicle dynamic conditions.

The SOC region determined by block 200 will be sent as one of the inputs to, at least, block 300. Additional description of the calculations and algorithms involved in determining SOC regions in block 200 and FIG. 3A may be found in U.S. patent application Ser. No. 15/090,035, filed on Apr. 4, 2016, which is hereby incorporated by reference in its entirety.

Figure 3B:
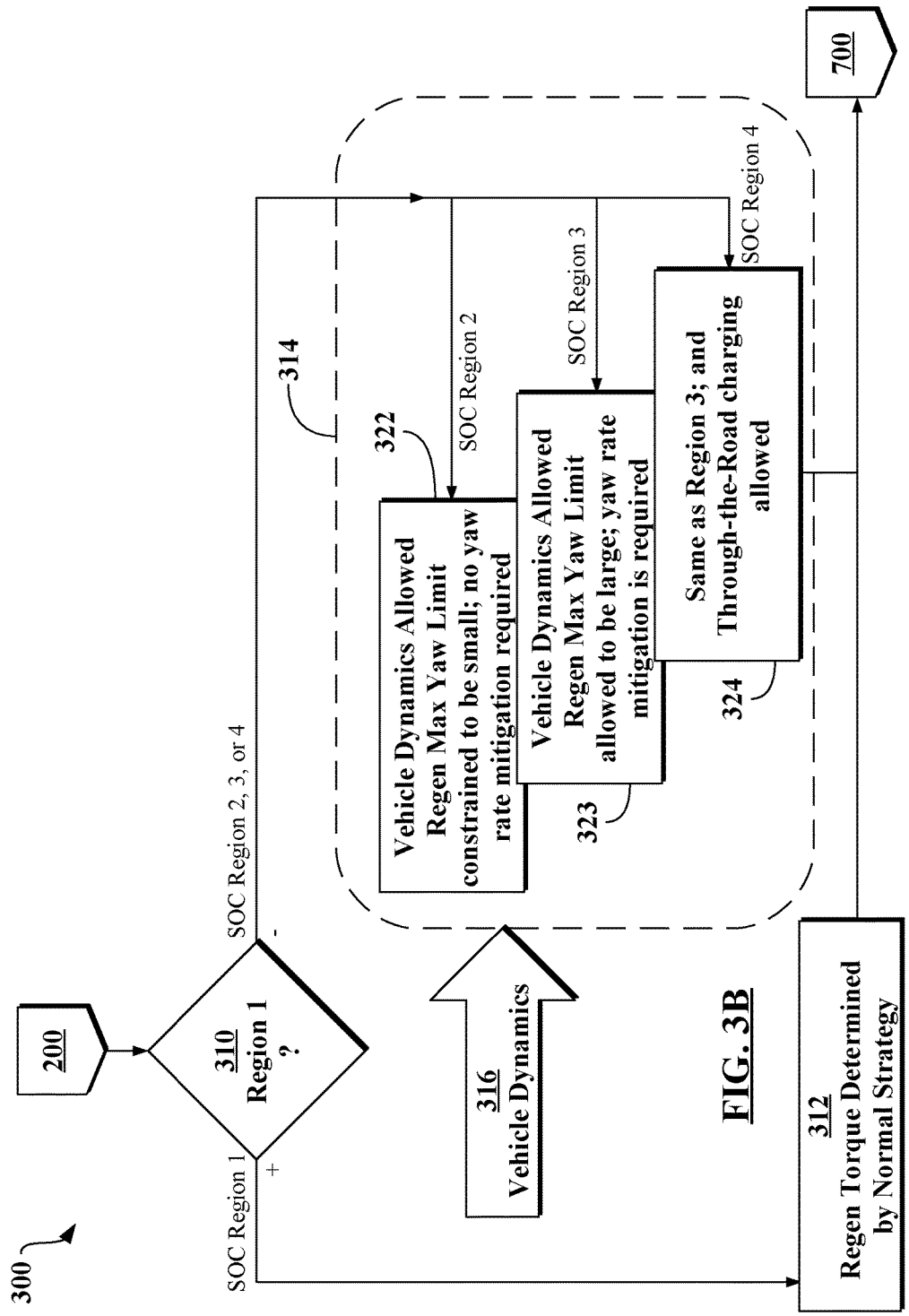
FIG. 3B is a schematic detail of a block 300 of FIG. 2, illustrating determination of vehicle dynamics and SOC based limits on yaw rate resulting from possible regeneration.

FIG. 3B is a schematic detail of the block 300 of FIG. 2, and generally illustrates determination of vehicle dynamics and SOC-based limits on yaw rate resulting from introduction of regeneration torque. As used herein, and throughout the figures, the term yaw may refer to either absolute yaw (twist or angle about a vertical axis) or yaw rate (change in yaw). Block 300 establishes the max amount of yaw disturbance from regeneration that the control scheme 100 will allow based on the current vehicle dynamic operating conditions and current state of charge of the battery 16.

Block 300 receives current vehicle dynamic conditions data, which may simply be referred to as the vehicle dynamics 316, and the SOC region determined by block 200. The vehicle dynamics 316 data may include, without limitation: speed, lateral acceleration, longitudinal acceleration, yaw rate, tire normal force, driver mode selection, and whether quick charge has been selected. Quick charge is a special mode that allows the driver of vehicle 10 to alert the controller 20 of a desire to quickly replenish the battery 16. The quick charge setting may result in the controller 20 automatically selecting the fourth SOC region 264.

Depending on the SOC region, the control scheme 100 may expand regeneration beyond the normal driver-demanded regeneration level, in order to more-quickly replenish the battery 16. This allows recharging of the battery 16 more rapidly than if operating at the driver-demanded regeneration level.

The control scheme 100 takes the SOC region sent by the block 200 and determines which of the SOC regions is in effect at decision 310. If the first SOC region 261 sent by block 200, the control scheme 100 proceeds to box 312.

If the first SOC region 261 is in effect, block 300 the control scheme 100 will not use an expanded regeneration strategy, such that the regeneration torque is determined by a normal regeneration strategy, as shown in box 212. The normal regeneration strategy does not go beyond the driver requested regeneration. Generally, the first SOC region 261 is selected based on limited need to aggressively charge the battery 16, such that the normal regeneration strategy will be sufficient to maintain SOC levels and allow hybrid operation when requested.

However, when one of the second through fourth SOC regions 262-264 is in operation, the control scheme 100 will proceed to box 314. For the other regions, the control scheme 100 will use an expanded regeneration strategy, as determined by box 314, and will charge the battery 16 during expanded driving conditions beyond that used during the first SOC region 261. Therefore, in box 314, the control scheme 100 determines the allowable change in yaw rate (or absolute yaw) that may be caused by the increased, more-aggressive use of regeneration from the expanded regeneration strategy. The control scheme 100 may be able to counteract or mitigate the yaw rate change determined in block 300.

The control scheme 100 therefore determines a Vehicle Dynamics Allowed Regen Max Yaw Limit, based on the SOC region, in box 314 based on current vehicle dynamics 316. There are three possible sub-routines of box 314, each of which determines a possible Vehicle Dynamics Allowed Regen Max Yaw Limit. A sub-routine 322 determines the Vehicle Dynamics Allowed Regen Max Yaw Limit when the second SOC region 262 is in effect, a sub-routine 323 determines the Vehicle Dynamics Allowed Regen Max Yaw Limit when the third SOC region 263 is in effect, and a sub-routine 324 determines the Vehicle Dynamics Allowed Regen Max Yaw Limit when the fourth SOC region 264 is in effect.

Each of the three possible Vehicle Dynamics Allowed Regen Max Yaw Limit values determined by the sub-routines 322, 323, and 324 is a model-based calculation of the amount of regeneration-induced change in yaw rate that the controller 20 will allow in order to implement the expanded regeneration strategy. These yaw rate change limits are based on current vehicle dynamics 316, such that the control scheme 100 incorporates whether the vehicle 10 is being driven aggressively.

Alternatively stated, although the controller 20 would like to aggressively implement regeneration from the electric machine 12 to quickly charge the battery 16, the controller 20 is not willing to do so regardless of the cost of increased yaw rate disturbance. This is particularly the case when the current vehicle dynamics would not allow for large regeneration-induced change in yaw rate without significantly affecting driver feel. The Vehicle Dynamics Allowed Regen Max Yaw Limit may therefore be referred to as the allowable yaw rate change.

The model may output the max yaw rate change based on the determined SOC region, which is then modified by vehicle dynamics conditions. Alternatively, as illustrated in FIG. 3B, the model may output specific Vehicle Dynamics Allowed Regen Max Yaw Limits for each of the three possible SOC regions having expanded regeneration strategy. The Vehicle Dynamics Allowed Regen Max Yaw Limit units may be either degrees for yaw or degrees per second for yaw rate.

For the second SOC region 262, the sub-routine 322 of box 314 constrains the Vehicle Dynamics Allowed Regen Max Yaw Limit, such that little or no mitigation of the regeneration-induced yaw rate change will be required. The mitigation may be implemented by other yaw rate-affecting subsystems, as shown elsewhere in control scheme 100.

For the third SOC region 263, the block 300 allows a large Vehicle Dynamics Allowed Regen Max Yaw Limit, such that mitigation of the regeneration-induced yaw rate change will be required. For the fourth SOC region 264, the block 300 allows the same Vehicle Dynamics Allowed Regen Max Yaw Limit, but will also allow through-road-charging. In through-road-charging, the ICE 14 communicates kinetic energy to the electric machine 12 by driving the wheels of the second axle 24, which moves the vehicle 10 relative to the road surface, and therefore drives the wheels of the first axle 22 through communication with the road. This allows the ICE 14 to utilize the electric machine 12 for regeneration even though there is no mechanical connection therebetween.

The Vehicle Dynamics Allowed Regen Max Yaw Limit determined by block 300 is an input to the remediation of block 700. The regeneration-induced yaw rate change determined by block 300 is the maximum yaw rate change that can be allowed under the current vehicle dynamics 316 and the determined or calculated SOC region. However, as laid out in the remainder of the control scheme 100, the controller 20 may not actually implement regeneration up to levels that would cause the full amount of allowed regeneration-induced yaw rate change that was determined in box 314.

Figures 3C, 3D:
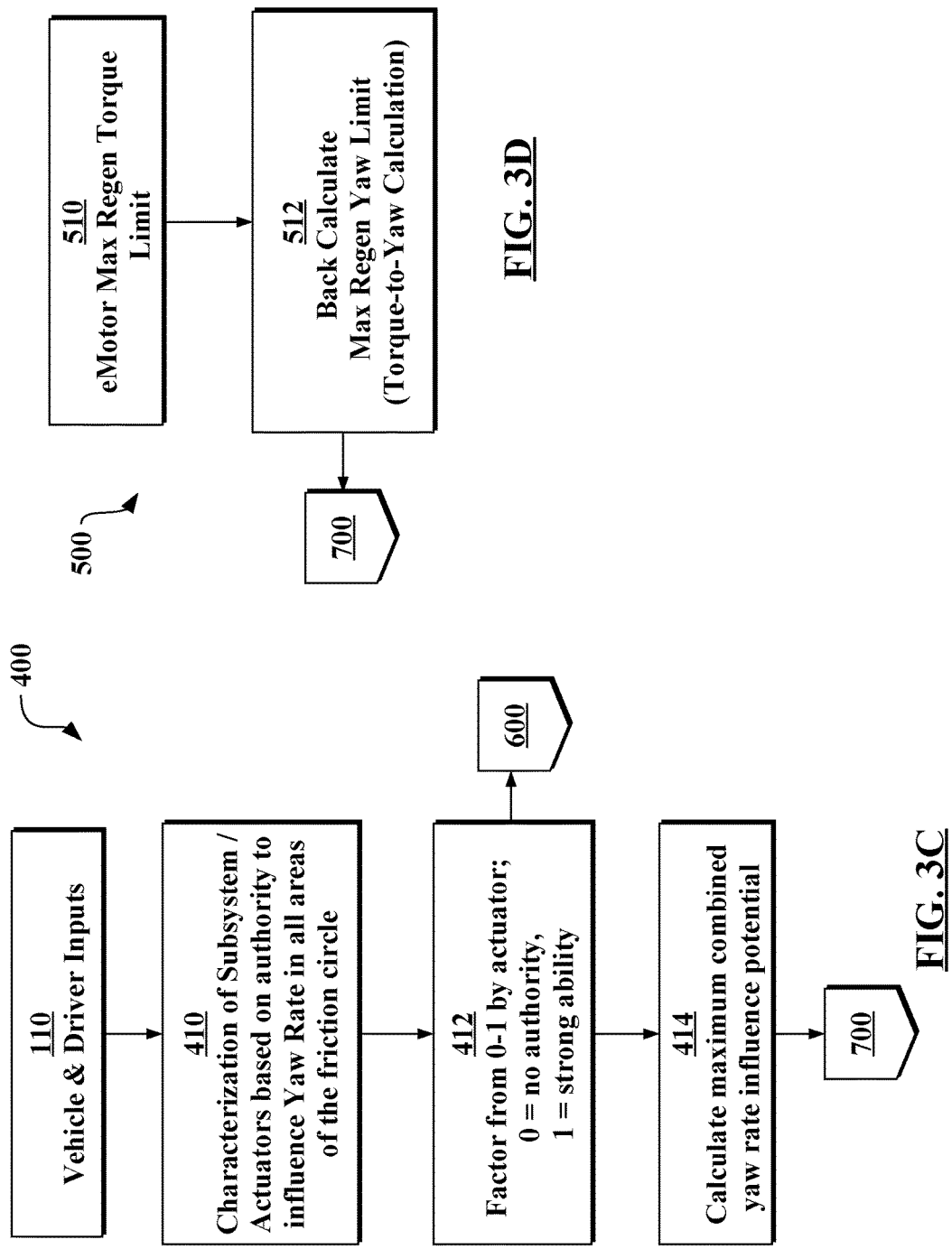
FIG. 3C is a schematic detail of a block 400 of FIG. 2, illustrating characterization of yaw rate-influencing subsystems and determination of total yaw rate influence potential.
FIG. 3D is a schematic detail of a block 500 of FIG. 2, illustrating determination of maximum possible yaw rate effect from regeneration by the electric machine.

FIG. 3C is a schematic detail of the block 400 of FIG. 2, illustrating characterization of yaw rate-influencing subsystems and determination of total yaw rate influence potential. Block 400 determines, in box 410, the ability of different components of the vehicle to influence yaw rate. Exemplary components include, without limitation: the anti-lock braking system (ABS), the individual friction brakes at each wheel, and the ICE 14 (as a supplier of either positive or negative torque). Each of the actuators or subsystems that can influence yaw rate is assigned, in box 412, a factor from 0-1, with a factor of 1 being a strong ability to influence yaw rate and a factor of 0 being no authority to influence yaw rate.

The calculations and determinations of block 400, in particular the individual factors assigned to each actuator, may be considered given inputs to the remainder of the control scheme 100. Block 400 calculates the maximum combined vehicle yaw rate influence potential, in box 414, and provides that as an input to the remediation of block 700. The maximum combined vehicle yaw rate influence potential units may be degrees per second.

FIG. 3D is a schematic detail of the block 500 of FIG. 2, illustrating determination of maximum possible yaw rate effect from regeneration by the electric machine. In box 510, the control scheme 100 receives the eMotor Max Regen Torque Limit as an input.

The eMotor Max Regen Torque Limit is the available regenerative capacity of the electric machine 12. This represents the ability of the electric machine 12 to produce regenerative torque. The units of eMotor Max Regen Torque Limit may be, for example, pound feet or newton meters.

From the available regenerative capacity of the electric machine 12, the control scheme 100 determines, in box 512, an eMotor Max Regen Yaw Limit, which is the amount of yaw rate change that would result if the full regenerative capacity of the electric machine 12 were used. The control scheme 100 uses a back calculation that relates the eMotor Max Regen Torque Limit (torque) with the eMotor Max Regen Yaw Limit (degrees per second).

The eMotor Max Regen Yaw Limit represents the maximum yaw rate change that could actually be caused by the electric machine 12, at the current dynamic vehicle conditions, regardless of any other yaw rate limits enacted or regenerative torque requested. The eMotor Max Regen Yaw Limit may also be referred to as the eMotor yaw rate capability. The eMotor Max Regen Yaw Limit determined by block 500 is an input to the remediation of block 700.

Figure 3E:
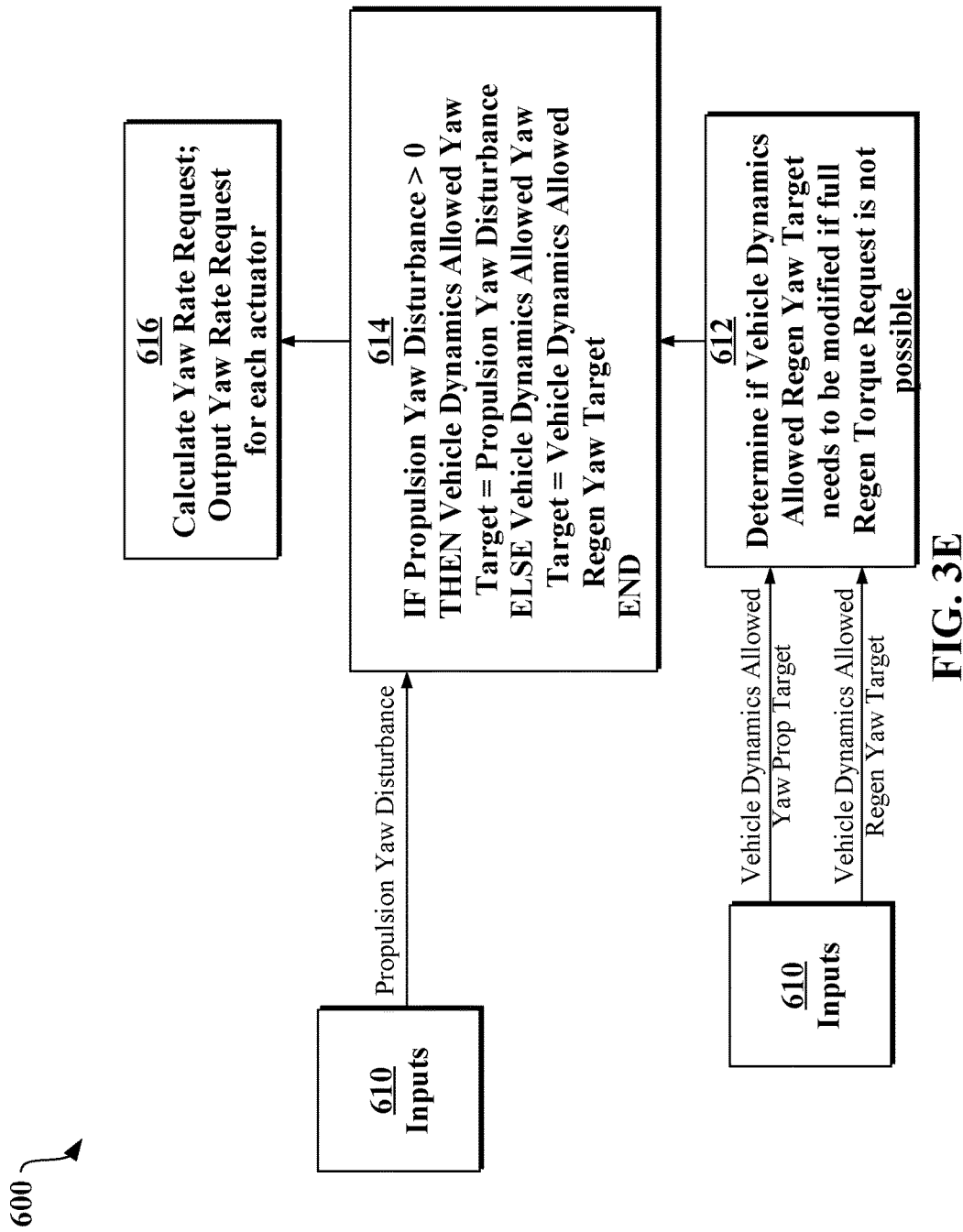
FIG. 3E is a schematic detail of a block 600 of FIG. 2, illustrating consideration of propulsion yaw rate and commanding individual yaw rate actuators.

FIG. 3E is a schematic detail of the block 600 of FIG. 2. The block 600 receives inputs 610, including propulsion yaw rate, such that the block 600 illustrates consideration of propulsion yaw rate and commanding the individual yaw rate actuators. In some situations, the driver of the vehicle 10 may be requesting propulsion, as opposed to regeneration, which causes disturbances.

Block 600 incorporates, in boxes 612 and 614, yaw rate disturbances caused by propulsion and other situations in which propulsion is at issue. In box 612, the control scheme 100 determines whether a Vehicle Dynamics Allowed Regen Yaw Target needs to be modified because the full Regen Torque Request is not possible. The Vehicle Dynamics Allowed Regen Yaw Target is the actual yaw rate change that will be implemented by the controller 20 for the vehicle 10.

In box 614, the Vehicle Dynamics Allowed Yaw Target is determined based on whether there is a propulsion yaw disturbance. Box 614 may be interpreted as a logic or algorithm rule: IF Propulsion Yaw Disturbance>0; THEN Vehicle Dynamics Allowed Yaw Target=Propulsion Yaw Disturbance; ELSE Vehicle Dynamics Allowed Yaw Target=Vehicle Dynamics Allowed Regen Yaw Target; END.

Block 600 also includes, in box 616, outputting yaw rate requests to each of a plurality of specific actuators affecting yaw. The algorithms, calculations, and models in block 600 may be considered given inputs to the remainder of the control scheme 100.

FIG. 3F is a schematic detail of the block 700 of FIG. 2, illustrating remediation between the vehicle dynamics limits, yaw rate influencers, and electric machine-derived yaw rate, and output as a regenerative torque request for the electric machine 12. The outputs from, at least, block 300, block 400, and block 500 provide inputs to block 700.

In block 700, when the controller 20 is requesting regeneration, as opposed to propulsion, the control scheme 100 conducts a comparison or remediation of competing yaw rate limits in box 710. Block 700 determines a Vehicle Dynamics Allowed Regen Yaw Target, which is the implemented regeneration-induced yaw rate change, from the competing yaw rate limits provided by blocks 300, 400, and 500. The Vehicle Dynamics Allowed Regen Yaw Target is the actual yaw rate change that will be implemented by the controller 20 for the vehicle 10.

Block 300 provides the Vehicle Dynamics Allowed Regen Max Yaw Limit, which is the maximum regeneration-induced yaw rate change allowable in light of the current vehicle dynamics 316 and selected SOC region. Block 400 provides the maximum combined vehicle yaw rate influence potential, which is the ability of other systems to mitigate or counteract yaw rate changes caused by regenerative torque. Block 500 provides the eMotor Max Regen Yaw Limit, which is the maximum yaw rate change that the electric machine 12 is capable of producing through regeneration torque.

When there is regenerative torque requested, the box 710 remediates between the inputs, in order to determine the actual yaw rate change that can be allowed in the vehicle 10. The box 710 compares the inputs and selects the smallest yaw rate limit of the three input considerations to block 700.

Where box 710 determines that the Vehicle Dynamics Allowed Regen Max Yaw Limit from block 300 is the lowest yaw rate limit, the current dynamic conditions and the SOC region of the vehicle 10 are limiting the amount of yaw rate that may be introduced by regeneration with the electric machine 12. This means that vehicle dynamics, in light of the SOC region, are the primary restriction on increased yaw rate, even though there is potential to create more yaw rate change with the electric machine 12 and potential to mitigate yaw rate change with the yaw rate-influencing subsystems.

Where box 710 determines that the maximum combined vehicle yaw rate influence potential from block 400 is the lowest yaw rate limit, the other yaw rate-influencing subsystems of the vehicle 10 are limiting the amount of yaw rate the may be introduced by increased regeneration with the electric machine 12. This means that other actuators are unable to counteract or mitigate yaw rate changes caused by increased yaw rate—i.e., the full amount of the Vehicle Dynamics Allowed Regen Max Yaw Limit from block 300 cannot be implemented without causing unwanted driving disturbances.

Where box 710 determines that the eMotor Max Regen Yaw Limit from block 500 is the lowest yaw rate limit, the capacity of the electric machine 12, or of the battery 16 to accept charge, is limiting the amount of yaw rate that can be introduced to the vehicle 10. This means that electric machine 12 is limited in its ability to create the regenerative torque that would result in increased yaw rate change. Alternatively stated, the amount of regeneration that the battery 16 can actually accept would create less yaw rate than the vehicle dynamics max or maximum combined vehicle yaw rate influence potential could mitigate.

Box 710 may be read as a logic or algorithm rule: IF Regen Torque Request=0; THEN Vehicle Dynamics Allowed Yaw Prop Target=Vehicle Yaw Influence Potential; ELSE Compare maximum combined Vehicle Yaw Influence Potential, Vehicle Dynamics Allowed Regen Max Yaw Limit, and eMotor Max Regen Yaw Limit AND Vehicle Dynamics Allowed Regen Yaw Target=smallest; END. Therefore, the algorithm in box 710 remediates the inputs and selects the smallest limit.

The lowest yaw rate limit is set as the Vehicle Dynamics Allowed Regen Yaw Target. In box 712, the control scheme 100 also converts the yaw rate target into a target torque, the Vehicle Dynamics Allowed Regen Torque Limit, which may be referred to simply as a regen torque request, by back calculating the relationship between torque and yaw rate change. This is a yaw-to-torque calculation.

Note that where the vehicle 10 is operating in the SOC region 1, the regen torque request 120 output from block 700 will simply be the driver-demanded regeneration, based on the normal regeneration strategy. However, where the vehicle 10 is operating in any of the second, third, or fourth SOC regions 262, 263, or 264, the regen torque request 120 from block 700 will be equal to the Vehicle Dynamics Allowed Regen Torque Limit determined through the remediation in box 710 and back calculation in box 712. The regen torque request 120 may also be referred to as a regeneration torque command, as the electric machine 12 is commanded to operate at the regen torque request 120.

Block 700 may also consider other factors. For example, the yaw rate requests for individual subsystems determined in block 600 may also lead to a reduction in the regen torque request.

After setting or outputting the regen output torque request 120, the control scheme 100 may end, loop, or repeat. In many implementations, the control scheme 100 will be constantly looping to verify the operating conditions of the vehicle 10 and to select the preferred regen torque request. In other configurations, the control scheme 100 will hold the regen torque request at a selected level until some event occurs to cause the control scheme 100 to repeat or recalculate.

The detailed description and the drawings or figures are supportive and descriptive of the subject matter discussed herein. While some of the best modes and other embodiments for have been described in detail, various alternative designs, configurations, and embodiments exist.

The invention claimed is:

1. A method of determining and implementing regeneration for a hybrid vehicle having an internal combustion engine, an electric machine, a plurality of yaw rate actuators, and a controller, the method comprising:
   determining, with the controller, an allowable yaw rate change based on dynamic conditions of the hybrid vehicle, wherein the allowable yaw rate change is the amount of regeneration-induced yaw rate change that the controller will allow while implementing regeneration with the electric machine;
   determining, with the controller, a combined mitigation potential of the plurality of yaw rate actuators, wherein the combined mitigation potential is the ability of the plurality of yaw rate actuators to influence yaw rate;
   determining, with the controller, a regeneration torque command for the electric machine that causes an actual yaw rate change, wherein the regeneration torque command is determined by the controller comparing the allowable yaw rate change to the combined mitigation potential:
      if the combined mitigation potential is less than the allowable yaw rate change, the regeneration torque command is reduced such that the actual yaw rate change is lower than the allowable yaw rate change, and
      if the combined mitigation potential is greater than the allowable yaw rate change, the regeneration torque command causes the actual yaw rate change to be substantially equal to the allowable yaw rate change; and
   executing the determined regeneration torque command with the electric machine, such that the vehicle is subjected to the actual yaw rate change.

2. The method of claim 1, further comprising:
determining an eMotor yaw rate capability from the regenerative capability of the electric machine, wherein determining the regeneration torque command also includes comparing the eMotor yaw rate capability to the allowable yaw rate change and the combined mitigation potential, and:
if the eMotor yaw rate capability is less than both the combined mitigation potential and the allowable yaw rate change, the regeneration torque command causes the actual yaw rate change to be substantially equal to the eMotor yaw rate capability.

3. A hybrid vehicle, comprising;
an internal combustion engine;
an electric machine decoupled from the internal combustion engine;
a battery; and
a controller configured to:
determine an allowable yaw rate change based on dynamic conditions of the hybrid vehicle, wherein the allowable yaw rate change is the amount of regeneration-induced yaw rate change that the controller will allow while implementing regeneration with the electric machine;
determine an eMotor yaw rate capability from the capacity of the electric machine and the battery;
determine a regeneration torque command that causes an actual yaw rate change by comparing the allowable yaw rate change to the eMotor yaw rate capability, wherein:
if the eMotor yaw rate capability is less than the allowable yaw rate change, and the regeneration torque command causes the actual yaw rate change to be lower than the allowable yaw rate change, and
if the eMotor yaw rate capability is greater than the allowable yaw rate change, the regeneration torque command causes the actual yaw rate change to be substantially equal to the allowable yaw rate change; and
execute the regeneration torque command with the electric machine, such that the hybrid vehicle is subjected to the actual yaw rate change.

4. The hybrid vehicle of claim 3, further comprising a plurality of yaw rate actuators, wherein the controller is further configured to:
determine a combined mitigation potential of the plurality of yaw rate actuators, and
determine the regeneration torque command based on the combined mitigation potential, such that if the combined mitigation potential is less than both the eMotor yaw rate capability and the allowable yaw rate change, the regeneration torque command causes the actual yaw rate change to be substantially equal to the combined mitigation potential.

5. A method of determining and implementing regeneration for a hybrid vehicle having an internal combustion engine, an electric machine, a plurality of yaw rate actuators, and a controller, the method comprising:
determining, with the controller, an allowable yaw rate change based on dynamic conditions of the hybrid vehicle, wherein the allowable yaw rate change is the maximum yaw limit that can be introduced to the vehicle by a regeneration torque;
determining, with the controller, a combined mitigation potential of the plurality of yaw rate actuators, wherein the combined mitigation potential is the amount of vehicle yaw that can be counteracted with the yaw rate actuators;
determining an eMotor yaw rate capability from capability of the electric machine to produce the regeneration torque;
determining, with the controller, a regeneration torque command for the electric machine that causes an actual yaw rate change, wherein the regeneration torque command is determined by the controller comparing the allowable yaw rate change to the combined mitigation potential:
if the combined mitigation potential is less than the allowable yaw rate change and the eMotor yaw rate capability, the regeneration torque command is reduced such that the actual yaw rate change is substantially equal to the eMotor yaw rate capability,
if the allowable yaw rate change is less than the combined mitigation potential and the eMotor yaw rate capability, the regeneration torque command causes the actual yaw rate change to be substantially equal to the allowable yaw rate change, and
if the eMotor yaw rate capability is less than both the combined mitigation potential and the allowable yaw rate change, the regeneration torque command causes the actual yaw rate change to be substantially equal to the eMotor yaw rate capability; and
executing the determined regeneration torque command with the electric machine, such that the electric machine produces the regeneration torque and the vehicle is subjected to the actual yaw rate change.

* * * * *